(12) United States Patent
Beierl et al.

(10) Patent No.: US 12,491,946 B2
(45) Date of Patent: Dec. 9, 2025

(54) ELECTRIC VEHICLE HAVING A TRACTION BATTERY

(71) Applicant: Dr. Ing. h.c. F. Porsche Aktiengesellschaft, Stuttgart (DE)

(72) Inventors: Dominik Beierl, Korntal-Münchingen (DE); Jan Bela, Sachsenheim (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 265 days.

(21) Appl. No.: 18/205,223

(22) Filed: Jun. 2, 2023

(65) Prior Publication Data

US 2023/0415823 A1 Dec. 28, 2023

(30) Foreign Application Priority Data

Jun. 28, 2022 (DE) ...................... 10 2022 116 020.3

(51) Int. Cl.
*B62D 25/24* (2006.01)
*B60L 53/16* (2019.01)

(52) U.S. Cl.
CPC .............. *B62D 25/24* (2013.01); *B60L 53/16* (2019.02); *B60Y 2200/91* (2013.01)

(58) Field of Classification Search
CPC ...... B62D 25/24; B60L 53/16; B60Y 2200/91
USPC .......................................................... 174/67
See application file for complete search history.

(56) References Cited

U.S. PATENT DOCUMENTS

2022/0381080 A1* 12/2022 Vlk .................... B60L 53/16

FOREIGN PATENT DOCUMENTS

| DE | 102008053973 A1 | 5/2010 |
| DE | 102015113463 A1 | 2/2017 |
| DE | 102021005524 A1 | 9/2021 |

* cited by examiner

*Primary Examiner* — Tremesha W Burns
(74) *Attorney, Agent, or Firm* — Buchanan Ingersoll & Rooney PC

(57) ABSTRACT

An electric vehicle having a traction battery, with a body having a charging port with a charging interface, which can be exposed or covered using a charging flap. The electric vehicle includes a combination flap, which is configured in the form of an air-conducting element and comprises the charging flap.

19 Claims, 3 Drawing Sheets

ELECTRIC VEHICLE HAVING A TRACTION BATTERY

CROSS-REFERENCE TO RELATED APPLICATION

This application claims priority to German Patent Application No. 10 2022 116 020.3, filed Jun. 28, 2022, the content of such application being incorporated by reference herein in its entirety.

FIELD OF THE INVENTION

The invention relates to an electric vehicle having a traction battery.

BACKGROUND OF THE INVENTION

Electric vehicles having a traction battery are sufficiently known. The traction battery serves to propel the electric vehicle in the form of an electric motor and requires a charging interface in a body of the electric vehicle, via which it can be charged with energy in the form of a power flow.

From the application DE 10 2015 113 463 A1, which is incorporated by reference herein, an electric vehicle having a charging interface arranged in the region of a mudguard for charging a traction battery is known, wherein the charging interface can be optionally covered or exposed by means of a covering element.

An electric vehicle with a front flap and a mudguard adjacent the front flap can be found in the application DE 10 2008 053 973 A1, which is incorporated by reference herein, wherein a flap, which is adjustable between an open position and a covered position, is arranged between the mudguard and the front flap, underneath which a charging interface for charging a traction battery is arranged.

SUMMARY OF THE INVENTION

An electric vehicle according to the present invention having a traction battery comprises a body with a charging port having a charging interface that can be exposed or covered with the aid of a charging flap. According to aspects of the invention, the electric vehicle comprises a combination flap, which is configured in the form of an air-conducting element and comprises the charging flap. That is to say, in other words, the electric vehicle has the combination flap consisting of the air-conducting element and the charging flap, which is configured so as to expose the charging interface and which can be used as an air-conducting element in the operation of the electric vehicle in order to reduce flow losses so as to reduce energy consumption. A further aerodynamic and aesthetic advantage is a reduction of joints in the body, which can lead to the inducement of turbulence and/or a reduction of an overall impression of the electric vehicle. Finally, with the aid of the invention, the body has a reduced number of ports, because only one port is configured for the charging port and for receiving of the air-conducting element in the body.

Advantageously, the combination flap is arranged in a rear region of the body so that an output of the electric vehicle can be advantageously adjusted in the rear region with the aid of the air-conducting element.

In order to realize the reduction of flow losses in a broad operating range, preferably in the entire operating range of the electric vehicle, the combination flap can be brought into different positions in a driving operation of the electric vehicle.

The combination flap could comprise the charging flap and the air-conducting element being independently movable. However, it is advantageous when the charging flap is configured so as to be coupled to the air-conducting element so that a secured positioning of the charging flap is inducible simultaneously with the air-conducting element. Thus, prior to a charging operation, the air-conducting element can be coupled to the charging flap so that, when the air-conducting element is moved, the charging flap is moved simultaneously and the charging interface can be swiftly exposed.

To the extent that the air-conducting element can be moved independently of the charging flap, an additional covering element of the charging port in order to secure the charging port during travel of the electric vehicle can be omitted, which can reduce costs of the electric vehicle. If the charging flap were permanently coupled to the air-conducting element, such a covering element would be necessary for safety reasons, because the charging flap is intended to cover the charging interface and protect against, for example, dirt, water, and other environmental factors.

For secure covering of the charging interface, the charging flap can be moved in dependence on the air-conducting element. This means that the charging interface cannot be exposed without movement, for example displacement of the air-conducting element, and is thus always covered securely.

Advantageously, the electric vehicle comprises a drive unit, which is configured so as to move the combination flap and to move the charging flap and the air-conducting element together or independently. In other words, in order to reduce costs, a drive unit is configured which, however, can be configured so as to move the charging flap as well as the air-conducting element.

In order to securely receive a charging cable in the charging interface, the drive unit is configured so that the combination flap fully exposes the charging port only in a charging state of the electric vehicle.

To further securely cover the charging port, the drive unit is further advantageously configured so that the charging flap fully covers the charging port in a driving operation of the electric vehicle.

BRIEF DESCRIPTION OF THE DRAWINGS

Further advantages, features, and details of the invention will arise from the following description of preferred embodiment examples as well as with the aid of the drawing. The features and feature combinations specified in the foregoing description, as well as the features and feature combinations specified hereinafter in the description of the drawings and/or shown alone in the figures, are able to be used not only in the respectively indicated combination, but also in other combinations, or on their own, without departing from the scope of the invention. Like or functional elements are associated with identical reference numbers. The figures show.

DETAILED DESCRIPTION OF THE INVENTION

Figure 1:
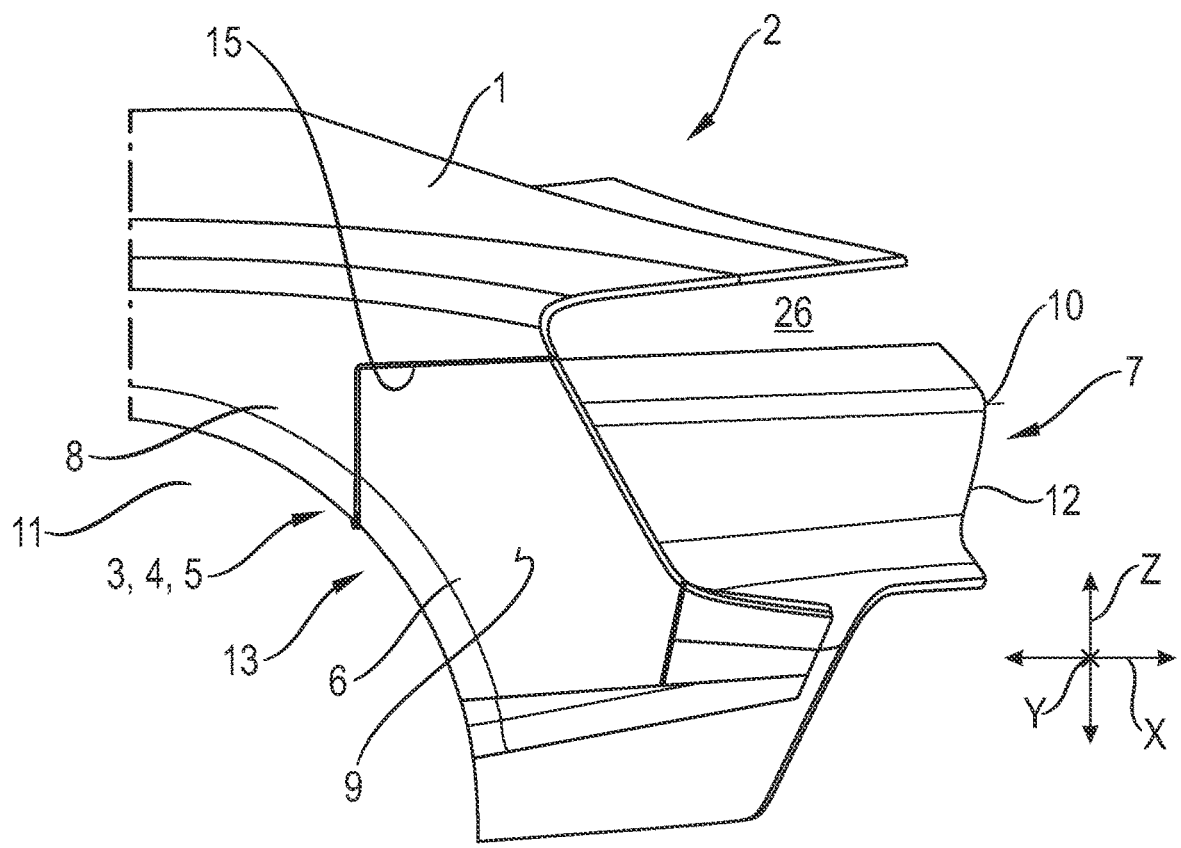
FIG. 1 in an excerpt, a side view of a body of an electric vehicle according to aspects of the invention, with a traction battery in a first operating state, FIG. 2 in an excerpt, the side view of the body of the electric vehicle according to aspects of the invention, with the traction battery in a second operating state, FIG. 3 in an excerpt, the side view of the body of the electric vehicle according to aspects of the invention, with the traction battery in a third operating state, FIG. 4 in a plan view, the electric vehicle according to aspects of the invention according to FIG. 3, FIG. 5 in a schematic diagram, a combination flap of the electric vehicle according to aspects of the invention, FIG. 6 in a schematic diagram, the combination flap with a coupling unit in a first coupling position, FIG. 7 in a schematic diagram, the combination flap with the coupling unit in a second coupling position, and FIG. 8 in a schematic diagram, the combination flap with the coupling unit in a third coupling position.

In FIG. 1, in an excerpt, a side view of a body 1 of an electric vehicle 2 according to aspects of the invention is shown, with a traction battery, which is not shown in greater detail, in a first operating state. The body 1 has a charging port 3 with a charging interface 4, which can be exposed or covered with the aid of a charging flap 5. Furthermore, the body 1 has an air-conducting element 6 in a region of a rear 7 of the body 1.

Preferably, the rear 7 is configured in a rounded manner in order to reduce a coefficient of air resistance or an air resistance of the body 1. However, the air-conducting element 6 and its predominant effect, the guiding of the air flow, are independent of a shape of the rear 7. The air-conducting element 6 forms part of the body 1, but can be moved relative to the remaining body 1.

The air-conducting element 6 is provided for the purpose of reducing turbulence in the air flow, which can lead to an increase in the coefficient of air resistance. For this purpose, the air-conducting element 6 can be moved relative to the remaining body 1, thus the portion of the body 1 without the air-conducting element 6, at least as part of a rear side part 8. The rear side part 8 comprises a flow-guiding surface 9 faces the surrounding environment, along which air flows and is conducted by it.

Figure 2:
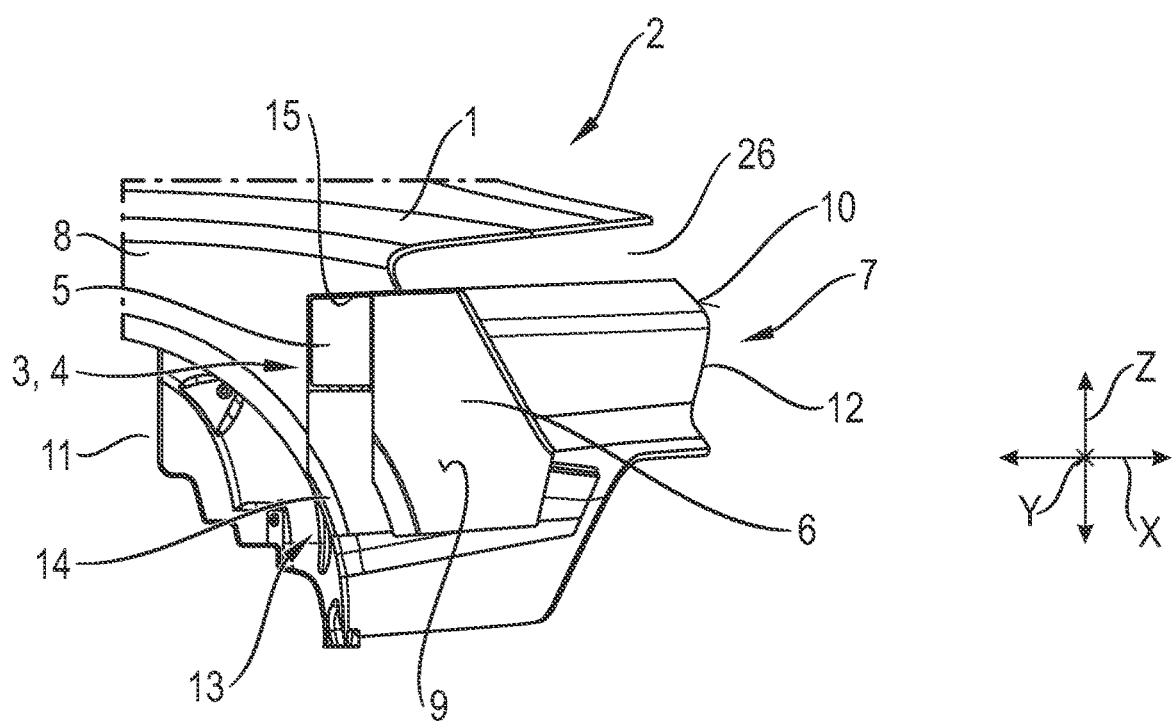

The air-conducting element 6 is in particular configured in its operational end position, in which it is depicted in FIG. 2, for extending the flow-guiding surface 9 along a longitudinal extension, thus in particular along a longitudinal body axis X of the body 1. In other words, in addition to its extension along the longitudinal body axis X, the air-conducting element 6 self-evidently also extends along a transverse body axis Y and a vertical body axis Z, as a result of which it also comprises a flow guidance along the transverse body axis Y and the vertical body axis Z. However, its function is predominantly an extension of the flow-guiding surface 9 to guide the flow along the longitudinal body axis X. Or, in further other words, the air-conducting element 6 is designed in particular in its operational end position for the extension of the flow-guiding surface 9 in the direction of a rear-terminating surface 10 along the longitudinal body axis X. It could also protrude over the rear-terminating surface 10.

The rear side part 8 is configured so as to at least partially comprise a wheel box 11 and, depending on the design of the body 1, can at least partially comprise a rear light port 26 and at least partially a bumper 12.

The electric vehicle 2 according to aspects of the invention comprises the air-conducting element 6 and the charging flap 5 in the form of a combination flap 13. Or, in other words, the electric vehicle 2 comprises a combination flap 13, which is configured in the form of an air-conducting element 6 and comprises the charging flap 5. The combination flap 13 is arranged in the rear side part 8, thus in the rear region of the body 1 on a side wall of the body 1, wherein the charging port 3 of the electric vehicle 2 according to aspects of the invention in the present embodiment example is configured in the rear side part 8.

A positioning of the air-conducting element 6 is preferably carried out with the aid of a pivoting motion and a translatory motion, which are coupled, wherein a drive unit of the electric vehicle 2, which is not shown in greater detail, is configured so as to implement this coupled movement in order to move the combination flap 13. In other words, a pivoting motion of the air-conducting element 6 about an axis of rotation is realized, which is superimposed on a translatory movement. Thus, the essential advantage of the air-conducting element 6 of the combination flap 13 consists of moving from the body 1 simultaneously in the direction of the longitudinal body axis X and the transverse body axis Y and bringing it into different positions.

The drive unit is configured so as to jointly or independently move the charging flap 5 and the air-conducting element 6, wherein, for securely receiving a charging cable not shown in greater detail in the charging interface 4, the drive unit is configured so that the combination flap 1 fully exposes the opening port 3 exclusively in a charging state of the electric vehicle 2. Furthermore, in order to further securely cover the charging port 3, the drive unit is configured so that the charging flap 5 fully covers the charging port 3 in the driving operation of the electric vehicle 2.

In the operational end position in which the air-conducting element 6 is set, in particular at medium and high speeds of the electric vehicle 2, the charging flap 5 is covered. It should be mentioned at this point that the charging flap 5 is covered even at low speeds, thus during the entire operation of the electric vehicle 2, whereas the air-conducting element 6 can be positioned in different positions during the operation of the vehicle, or in other words can be moved into different positions. That is to say, in other words, the combination flap 13, one component of which is the air-conducting element 6, can be brought into different positions during travel.

Figure 3:
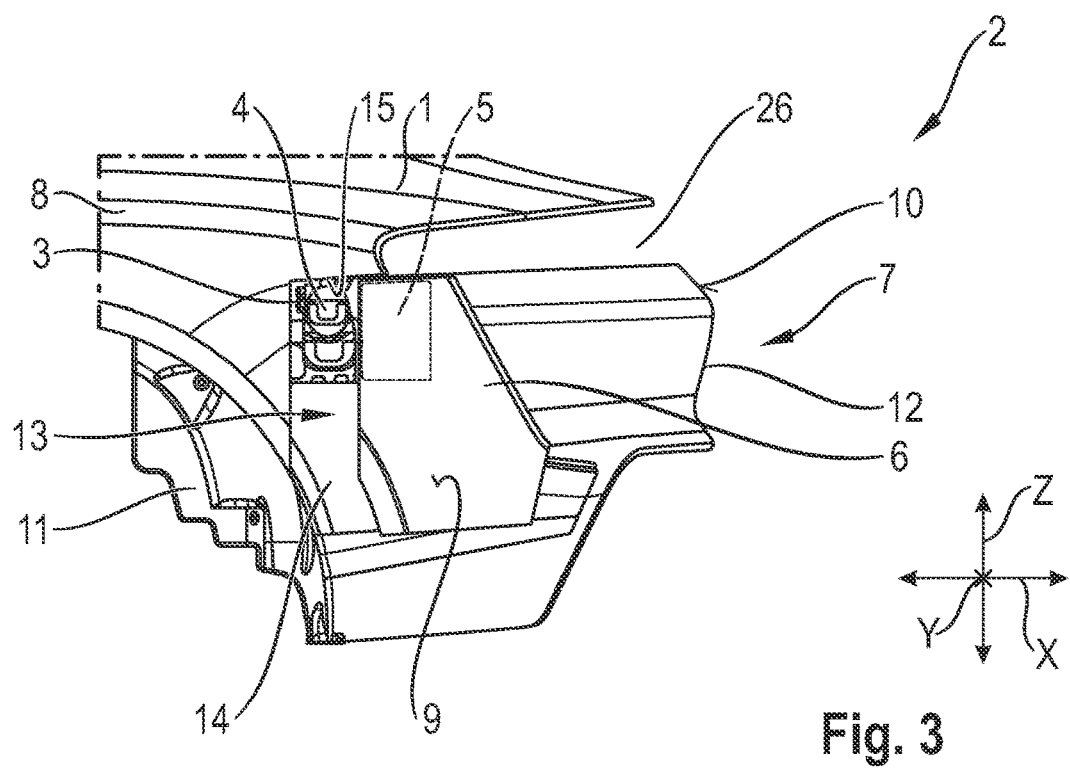

In FIGS. 1 to 3, the body 1 of the electric vehicle 2 according to aspects of the invention is depicted in different operating states, wherein the combination flap 13 according to FIG. 1 is illustrated in a first operating state, which is characterized by a flush arrangement of the combination flap 13 in the rear side part 8. In other words, the charging flap 5 and the air-conducting element 6 are arranged entirely in the rear side portion 8, as is preferably provided while idling or at low speeds of the electric vehicle 2. The charging port 3 is fully covered, the air-conducting element 6 is "retracted," and a reduced joint pattern is formed in the rear side portion 8.

In FIG. 2, the body 1 of the electric vehicle 2 according to aspects of the invention is depicted in a second operating state, wherein the air-conducting element 6 is positioned rearward along the longitudinal body axis X, thus in the direction of the rear 7. The charging flap 5 is further arranged so as to cover the charging port 3 completely. This second operating state is preferably provided at high speeds of the electric vehicle 2. In other words, the air-conducting element 6 is "extended," in particular in a speed range in which it exhibits aerodynamic efficacy.

At this point, it should be mentioned that it is possible, depending on the configuration of a drive unit of the electric vehicle 2 for the combination flap 13 not shown in greater detail, to implement further operating states of the body 1 during operation of the electric vehicle 2 between the first operating state and the second operating state. In other words, the air-conducting element 6 can occupy further positions between its first position, which is depicted in FIG. 1, and its second position, which is depicted in FIG. 2, wherein the first position and the second position are boundary positions between which further positions can be assumed, as is preferably provided in a mid-speed range of the electric vehicle 2. In other words, in its first position, the air-conducting element 6 is arranged in its maximum possible position in the direction of a front of the body 1, which is configured so as to face away from the rear 7, whereas, in its second position, it is positioned in its maximum possible position in the direction of the rear 7. The air-conducting element 6 can be moved in these operating states of the body 1 independently of the charging flap 5.

Figure 4:
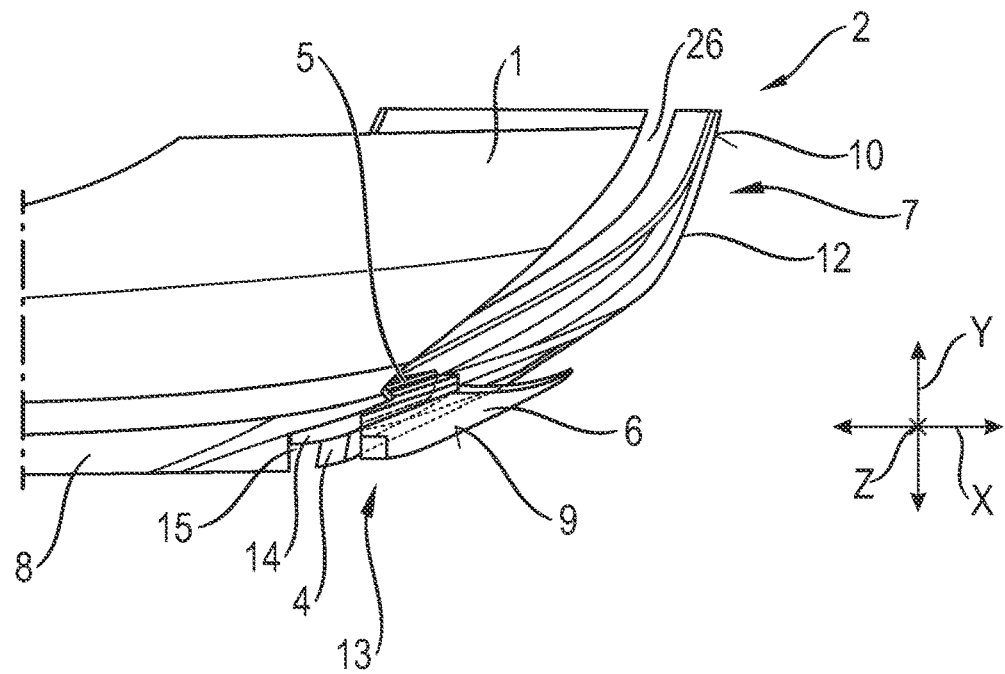

The body 1 of the electric vehicle 2 according to aspects of the invention is illustrated in FIG. 3 in a third operating state, wherein the air-conducting element 6 and the charging flap 5 are positioned rearward along the longitudinal body axis X, thus in the direction of the rear 7. The charging port 3 is exposed so that an electric cable, not shown in greater detail, can be received in the charging interface 4. This third operating state can only be realized in the charging operation of the electric vehicle 2. In FIG. 4, the body 1 in this third operating state is illustrated in a top plan view. In this third operating state, which corresponds to a charging state of the electric vehicle 2, the combination flap 13 is arranged so as to fully expose the charging port 3.

It can be seen that, in the present embodiment example, the charging flap 5 is designed to be shorter than the air-conducting element 6 in the direction of a vertical body axis Z, which is configured orthogonally to the longitudinal body axis X and the transverse body axis Y, so that a covering element 14 is arranged in order to cover a body port 15, which preferably comprises the charging port 3 and is placed in a position and can be arranged immovably.

Figure 5:
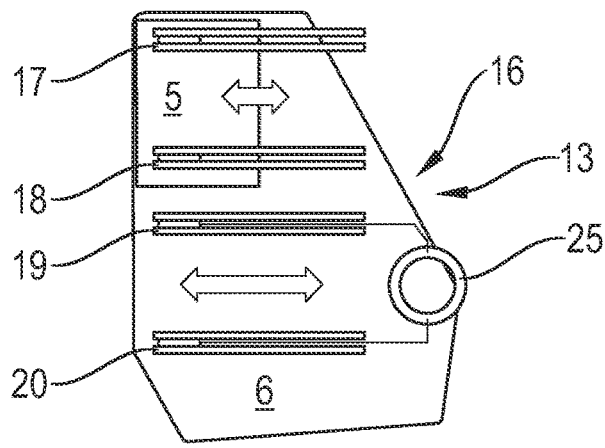

The combination flap 13 is configured so as to couple the charging flap 5 with the air-conducting element 6. In FIG. 5, the combination flap is depicted in a schematic diagram with a coupling unit 16. The charging flap 3 has a first charging flap guide 17 and a second charging flap guide 18. A first element guide 19 and a second element guide 20 are associated with the air-conducting element 6. The second charging flap guide 18 and the first element guide 19 are configured so as to couple the charging flap 3 and the air-conducting element 6 so that they can be coupled in order to perform a joint motion. The coupling unit 16 thus comprises the second charging flap guide 18 and the first element guide 19. In the direction of the arrows, the charging flap 3 and the air-conducting element 6 are thus movable together or separately from one another.

Figure 6:
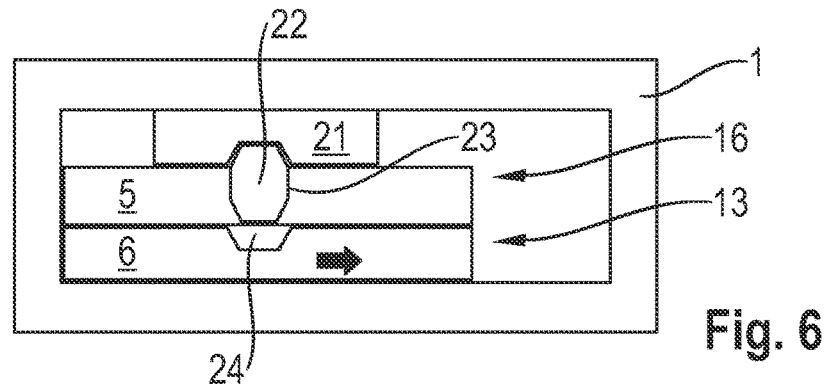
Figure 7:
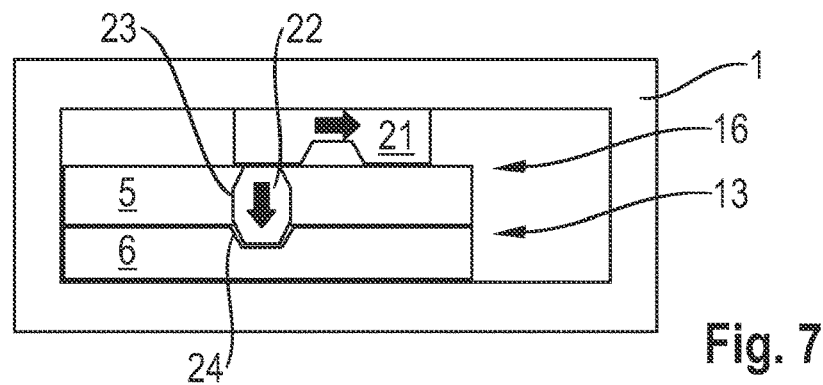
Figure 8:
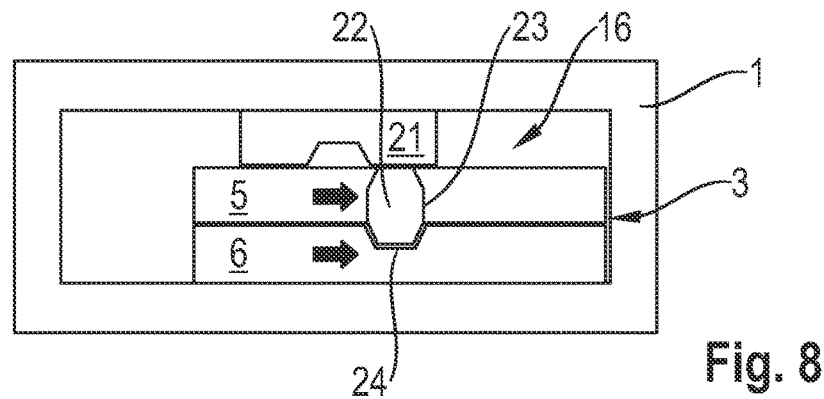

In FIGS. 6 to 8, the coupling unit 16 is depicted in a schematic diagram, wherein the coupling unit 16 further comprises a first coupling element 21 in the form of a slider and a second coupling element 22, which configured so as to induce a form-fit with the first coupling element and is configured in the form of a pin in the present embodiment example.

In the first coupling position, with the aid of the first coupling element 21, the second coupling element 22 is positioned so as to be engaged with a third coupling element 23 formed in the charging flap 3 and with a fourth coupling element 24 formed in the air-conducting element 6. In the second coupling position, the second coupling element 22 is connected to the third coupling element 23 and to the fourth coupling element 24, wherein a form-fit connection is produced in each case. A connection to the coupling slider 21 is disengaged so that, as illustrated in FIG. 8, the charging flap 3 and the air-conducting element 6 can be slid together. The charging flap 3 is thus movable in dependence on the air-conducting element 6.

With the aid of an actuating element 25, the air-conducting element 6 can adjusted into its further positions.

LIST OF REFERENCE NUMBERS

1 Body
2 Electric vehicle
3 Charging port
4 Charging interface
5 Charging flap
6 Air-conducting element
7 Rear
8 Rear side part
9 Flow-guiding surface
10 Rear-terminating surface
11 Wheel box
12 Bumper
13 Combination flap
14 Covering element
15 Body port
16 Coupling unit
17 First charging flap guide
18 Second charging flap guide
19 First element guide
20 Second element guide
21 First coupling element
22 First coupling element
23 Second coupling element
24 Third coupling element
25 Actuating element
26 Rear light port
X Longitudinal body axis
Y Transverse body axis
Z Vertical body axis

What is claimed is:

1. An electric vehicle having a traction battery, said electric vehicle comprising:
   a body having a charging port with a charging interface,
   a charging flap assembly comprising (i) a first flap that is moveable to either expose or conceal the charging interface, and
   (ii) a second flap in the form of an air-conducting element that constitutes an exterior body panel of the electric vehicle,
   wherein the second flap is movable with respect to the first flap.

2. The electric vehicle according to claim 1, wherein the flap assembly is arranged in a rear region of the body.

3. The electric vehicle according to claim 1, wherein the flap assembly is arranged in a side wall of the body.

4. The electric vehicle according to claim 1, wherein the flap assembly is configured to be brought into different positions in a driving operation of the electric vehicle.

5. The electric vehicle according to claim 1, wherein the first flap is coupled to the air-conducting element.

6. The electric vehicle according to claim 1, wherein the first flap is configured to be moved in dependence on the second flap.

7. The electric vehicle according to claim 1, wherein the flap assembly comprises a drive unit configured to move the first flap and/or the second flap.

8. The electric vehicle according to claim 7, wherein the drive unit is configured so that the flap assembly fully exposes the charging port exclusively in a charging state of the electric vehicle.

9. The electric vehicle according to claim 7, wherein the drive unit is configured so that the first flap fully covers the charging port in a driving state of the electric vehicle.

10. The electric vehicle according to claim 1, wherein the second flap is positioned over the first flap such that the second flap conceals the first flap when the first and second flaps are maintained in their home positions.

11. The electric vehicle according to claim 1, wherein in a first configuration of the flap assembly, the second flap is movable from its home position to its deployed position while the first flap remains in its home position.

12. The electric vehicle according to claim 11, wherein in a second configuration of the flap assembly, the first flap is movable from its home position to its deployed position while the second flap remains in its deployed position.

13. The electric vehicle according to claim 12, wherein in a third configuration of the flap assembly, the first and second flaps are locked together such that the first and second flaps are moveable together from their deployed positions to their home positions.

14. The electric vehicle according to claim 1, wherein in one configuration of the flap assembly, the first and second flaps are locked together such that the first and second flaps are moveable together from their home positions to their deployed position.

15. The electric vehicle according to claim 1, wherein the flap assembly further comprises a moveable coupling element that is moveable from a first position in which the first flap is decoupled from and moveable relative to the second flap and a second position in which the first flap is fixed to the second flap.

16. The electric vehicle according to claim 15, wherein the flap assembly further comprises a slide member that bears on the moveable coupling element and is configured to move the moveable coupling element from the first position to the second position.

17. The electric vehicle according to claim 16, wherein the first and second flaps and the slide member are movable in a longitudinal direction and the moveable coupling element is moveable in a transverse direction.

18. The electric vehicle according to claim 15, wherein the first and second flaps are movable in a longitudinal direction and the moveable coupling element is moveable in a transverse direction.

19. The electric vehicle according to claim 1, wherein the flap assembly further comprises (i) a first guide on which the first flap moves between its home position and its deployed position and (ii) a second guide on which the second flap moves between its home position and its deployed position.

* * * * *